April 14, 1964 R. C. L. CROMMEN 3,129,295

AUTOMATIC TELEPHONE CALL DEVICE

Filed Dec. 21, 1959 3 Sheets-Sheet 1

Inventor

ROGER CHARLES LÉON CROMMEN

By Toulmin & Toulmin

Attorneys

April 14, 1964 R. C. L. CROMMEN 3,129,295

AUTOMATIC TELEPHONE CALL DEVICE

Filed Dec. 21, 1959 3 Sheets-Sheet 2

Inventor
ROGER CHARLES LEON CROMMEN
By Toulmin & Toulmin
Attorneys

April 14, 1964 R. C. L. CROMMEN 3,129,295

AUTOMATIC TELEPHONE CALL DEVICE

Filed Dec. 21, 1959 3 Sheets-Sheet 3

Inventor
ROGER CHARLES LEON CROMMEN
By Toulmin & Toulmin
Attorneys 3,129,295

AUTOMATIC TELEPHONE CALL DEVICE

Roger Charles Léon Crommen, Valence, France, assignor to Compagnie Crouzet, Valence, France, a company of France Filed Dec. 21, 1959, Ser. No. 860,901
Claims priority, application France Dec. 22, 1958
7 Claims. (Cl. 179—90)

The present invention has for its subject matter an automatic call device adapted to detect the characteristic signs of the call-number of a key in the form of a rectangular shaped plate on which the representative signs are grouped in transverse series succeeding one another, in the longitudinal direction, said device, which is adapted to produce series of pulses corresponding to these signs, comprising in combination, detecting means detecting the characteristic signs and adapted to produce pulses corresponding to said signs, and driving means adapted to produce a relative displacement between said detecting means and the key, whereby the entire zone occupied by the signs in question can be explored by the detecting means, said driving means moving the plate longitudinally and the detecting means in a transverse to-and-fro movement, whereas the detecting means advantageously consists of a follower-contactor assembly.

Advantageously the driving means comprise elastic means tending to displace the plate longitudinally in the course of the transverse to-and-fro movement of the detecting means and to eject it from the device at the end of the call operations.

The detecting means are supported by a pivotal lever whose transverse sweeping or scanning movement (to-and-fro movement) is controlled by the rotation of a heart-shape cam (or by any other device affording a like movement).

The cam actuating the pivotal lever also controls, in the position of rest, the opening of the secondary contacts in the interval of time between the detection of the two series of signs.

In a particular embodiment of the call device, the elastic means tending to displace the plate longitudinally act as driving means for actuating the cam controlling the pivotal lever.

In a modification, the elastic means only produce the longitudinal movement of the plate, the sweep movement of the pivotal lever being controlled by a separate motor, for example a small electric motor.

The supply circuit of the electric motor is advantageously controlled by a contactor which is closed when the plate is fully introduced and is once more opened when said plate reaches the position corresponding to the end of the detection of the characteristic signs.

In an improved embodiment of the call device, utilizable with a plate laterally provided with retaining teeth whose pitch corresponds to twice the spacing (pitch) between adjacent series of signs, there are provided two retaining pawls actuated successively at each end of the travel of the pivotal lever.

Two contactor means in series are provided in the supply circuit of the electric motor controlling the sweep movement of the pivotal lever, one of the contactor means, which are normally closed, being opened by the plate when it is fully inserted in the call device, whereas the other contactor means, which could be closed by the insertion of the plate, co-operate with the periphery of a notched disc whose rotary motion is connected with that of the heart-shape cam.

Further features and advantages of the invention will be apparent from the ensuing description of some embodiments of call-number keys and automatic call devices, which embodiments are given merely by way of example and are shown diagrammatically in the accompanying drawings, in which.

The problem to be solved is to compose automatically a subscriber's telephone number by merely introducing in a special device a call number key which is advantageously in the form of a plate, without need to use the dialing disc of conventional telephone apparatus.

The plate is particular to a subscriber's telephone number and the holder of this number could, for example for purposes of publicity, distribute this plate to his clients or usual correspondents.

Such a plate could be advantageously used in an appropriate filing cabinet where it could be classified alphabetically. Thus the caller has no longer to seek the number to be called or to compose this number on the dial by remembering the letters and numbers in the correct order for emission.

The call device utilizing the call number plate is connected in parallel with the contactor of the dialing disc of the normal telephone apparatus, whose disc moreover remains utilizable for all telephone numbers for which there is no call-number plate.

Figure 1:
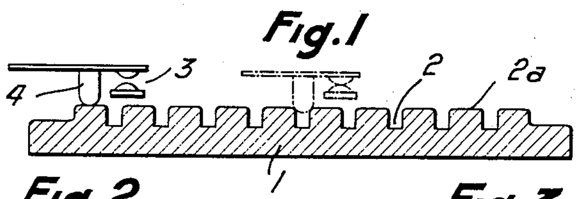
FIG. 1 is a cross-sectional view on a large scale of call-number key in the form of a plate and co-operating with a sign detector, the signs in this plate being constituted by recesses and bosses.
Figure 2:
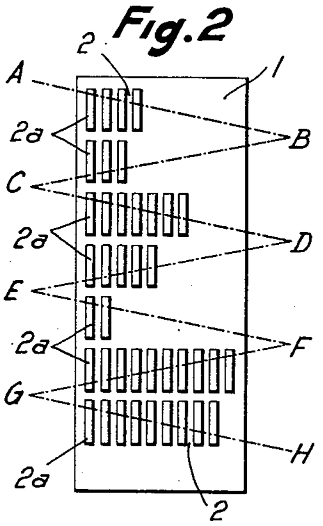
FIG. 2 is a plan view of a plate with the relative zig-zag line of motion or path of the sign detecting means.

In a first embodiment of the plate 1, which is shown in FIGS. 1 and 2, the latter is advantageously rectangular and has on one of its faces several series of recesses or grooves 2 disposed one after the other in the longitudinal direction of the plate, each series corresponding to a sign of the call-number (letters or numbers of a conventional dial). These recesses 2, which are separated by bosses 2*a*, are adapted to co-operate with a sign detector constituted by a contactor 3 whose mobile element is connected to a follower or feeler finger 4 which explores each series of recesses in succession, so that, in each series of recesses, the sweep travel of the detector is manifested by as many circuit closings and openings as the series in question possesses recesses. These recesses have advantageously such form and dimensions that the opening time is twice the closing time of the contactor 3 (so that this ratio of the times corresponds to that of the operational times of the contactor of conventional dials).

If the plate 1 is displaced in the longitudinal direction while the detector undergoes a transverse sweep movement, this detector describes, relative to the plate, the broken line A, B, C, D, E, F, G, H shown in FIG. 2. In each of the paths A—B, B—C, C—D, D—E, E—F, F—G, G—H there exists in the series of recesses the number of recesses corresponding to the successive letters and numbers of the number to be composed.

For each change in the sweep direction of the sign detector, the opening of complementary contacts is caused to occur, as will be seen hereinafter (these complementary contacts perform the same function as the complementary contacts of the dial-type call device, which latter contacts are maintained open during the time intervals between two actuations of the dial).

The rectangular plate shaped key should be moulded of plastic material.

Figure 3:
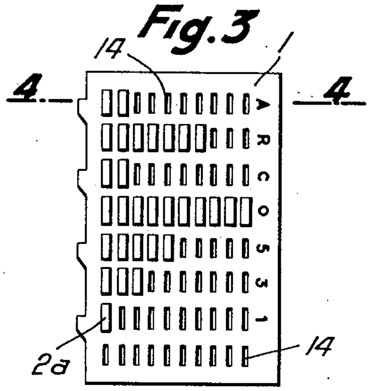
FIG. 3 is a plan view of a plate having signs which are mounted thereon.
Figure 4:
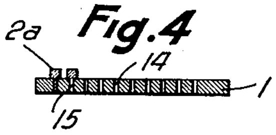
FIG. 4 is a sectional view taken along line 4—4 of FIG. 3.

In the embodiment shown in FIGS. 3 and 4, the plate 1 is provided with perforations 14 adapted to receive the stems 15 of studs constituting the bosses 2*a*; these studs are merely pressed in position as desired. The studs could also be secured to the plate 2 by an adhesive (notably when these elements are composed of plastic material).

Figure 5:
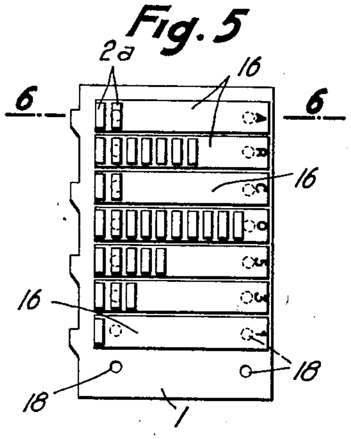
FIG. 5 is a plan view of another embodiment of a plate having signs which are mounted thereon.
Figure 6:
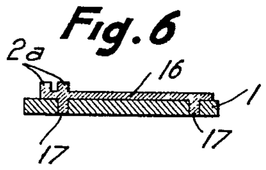
FIG. 6 is a sectional view taken along line 6—6 of FIG. 5.

In the modification shown in FIGS. 5 and 6, each call-number (series of signs) is constituted by a strip 16 carrying bosses 2*a* and having two spigots 17 at each end which are engaged in apertures 18 in a plate 1.

Figure 7:
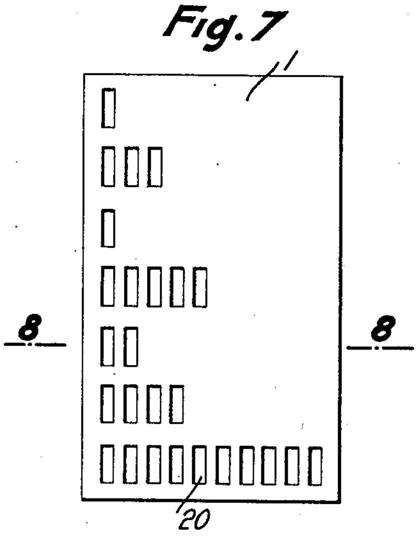
FIG. 7 is a plan view of a plate in the form of a card in which the signs are represented by perforations.
Figure 8:
FIG. 8 is a sectional view taken along line 8—8 of FIG. 7.
Figure 9:
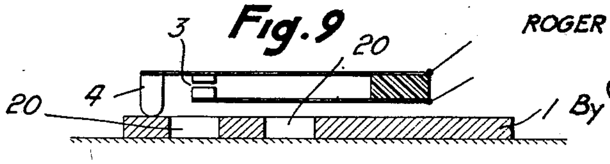
FIG. 9 is a sectional view, on an enlarged scale, of a part of the perforated card, with the sign detecting means co-operating with the perforations.

In an advantageous embodiment, shown in FIGS. 7, 8, 9, the plate 1 has perforations 20 instead of recesses. In this case, the "bosses" are constituted by the unperforated parts of the plate between the perforations.

In a first embodiment (shown in FIG. 10), of an automatic call device utilizing rectangular plate shaped keys, said call device comprises a loading lever 26 pivotably mounted at 27 and subjected to the action of a spring 28 which bears against a fixed pin 29 and tends to pivot the lever 26 in a counterclockwise direction (arrow $F_1$).

At its free end, the loading lever 26 carries a pin 30 adapted to co-operate with the rear edge of the plate 1. The lever 26 carries a pawl 31 adapted to co-operate with a ratchet wheel 32 rigid with a gear 33 meshed with a pinion gear 34. The latter is rigid with a gear 35 meshed with the pinion gear 36 of a governor 37.

The assembly 34—35 is also rigid with a heart-shape cam 38 whose periphery co-operates with the stud 39 of the arm 40*a* of a cranked lever 40 pivotably mounted at 41 and biased by a spring (not shown in the drawing) which tends to pivot it in such manner as to maintain the stud 39 in contact with the cam 38.

The other arm 40*b* of the lever 40 carries at its free end the detecting means 42 (contactor) responsive to characteristic signs of the call-number carried by the plate 1.

The cam 38 also carries two control lugs 43 which, at each end of the pivotal travel of the lever 40, cause the opening of complementary contacts 44 (similar to those the conventional dial call devices possess).

The device just described, operates in the following manner:

When the plate 1 is inserted in an opening or slot 25 in the casing of the device 24, the loading lever 26 is pivoted in the direction of arrow $F_2$ and the spring 28 is put under tension. When, after it has been fully inserted, the plate 1 is released, the spring 28, which was put under tension, tends to pivot the lever 26 in the direction of arrow $F_1$ and the pawl 31 engages the ratchet wheel 32. The entire mechanism starts to function at a substantially constant speed regulated by the governor 37. The plate 1 is slowly urged outwardly and simultaneously the signs carried thereby are each explored transversely by the detecting means 42, which effects a transverse to-and-fro movement under the effect of the cam 38.

At the end of the call operations, the plate 1 is completely ejected from the device and is available for another automatic call operation. During the ejection of the plate, the cam 38 effects as many semi-revolutions as the call-number to compose comprises numbers (or letters) and the lever 40*b* effects a corresponding number of to-and-fro movement.

In the embodiment of the device just described, the spring 28 must store in one go all the energy which, in a conventional call dial is furnished by as many successive loadings as the call-number being dialed has numbers (or letters). The considerable force required to load the spring 28 could constitute a certain disadvantage.

Figures 10, 11, 12:
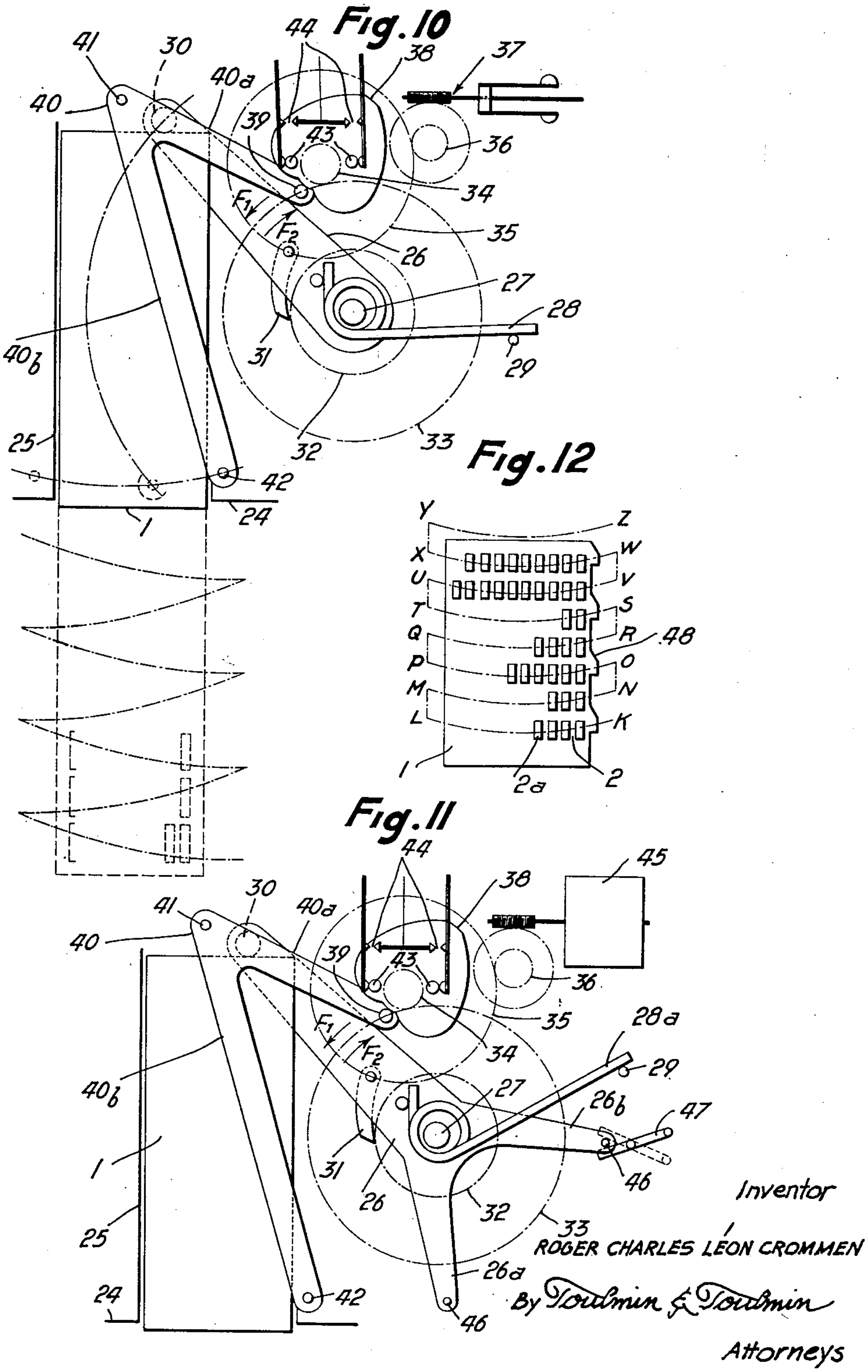
FIG. 10 is a diagrammatic view of a first embodiment of an automatic call device utilizing a rectangular plate.
FIG. 11 is a diagrammatic view of a second embodiment of the call device.
FIG. 12 is a plan view of a call-number plate with another relative line of motion of the sign detecting means.

To obviate this disadvantage, the automatic call device could be modified as shown in FIG. 11 in which the same reference characters designate the elements previously described.

In this modification, the spring 28*a* has just sufficient force to eject or displace the plate 1 which had been inserted in the device. The governor of the previous embodiment is replaced by a micromotor 45 which controls the rotation of the cam 38 and of the gear 33 rigid with the ratchet wheel 32. The pawl 31 is adapted to retain the lever 26 so as to ensure its slow and regular travel in the direction of arrow $F_1$.

The lever 26 carries two arms 26*a* and 26*b* each of which carries a pin 46 which controls, at the end of travel a switch 47 controlling operation of the motor 45. At the end of the pivotal movement of the lever 26 in the direction of arrow $F_2$ (corresponding to insertion of the plate 1) the arm 26*b* closes the switch 47 which starts up the motor 45. At the end of the pivotal movement of the lever 26 in the direction of arrow $F_1$ (ejection or return of the plate 1), the arm 26*a* opens the switch 47.

In the modification of the plate shown in FIG. 12, the plate 1 is adapted to be moved step by step (instead being caused to undergo a continuous movement) in the course of emission of the call. To this end, one of the longitudinal edges of the plate is provided with teeth 48 the pitch of which is twice the pitch of the transverse series of the characteristic signs.

Figure 13:
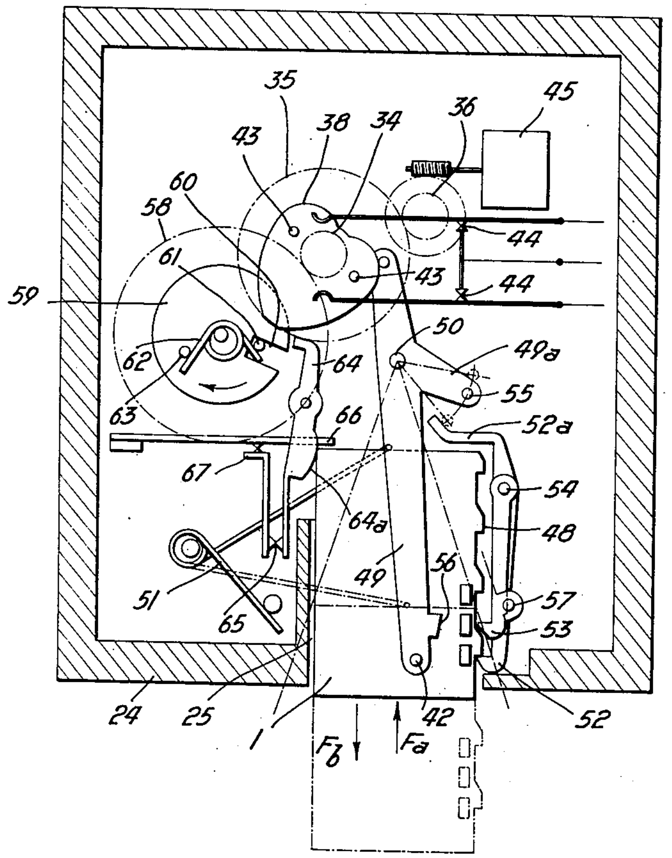
FIG. 13 is a diagrammatic view of a call device utilizing the plate shown in FIG. 12.
Figure 14:
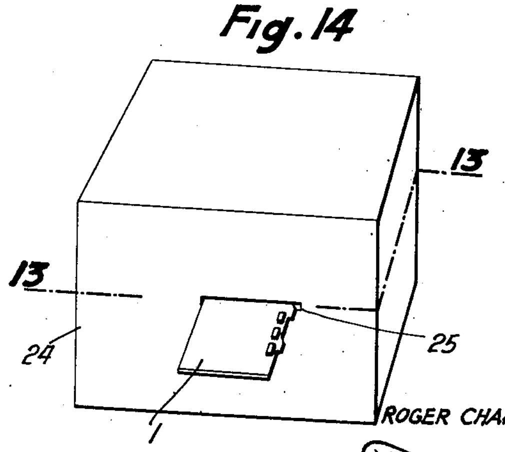
FIG. 14 is an isometric view of the complete apparatus of FIG. 13, the plate shaped key being in rejection position.

The exploration of the signs is in this case effected along the path K—L—M—N—O—P—Q—R—S—T—U—V—W—X—Y—Z advantageously by means of the device shown in FIG. 13 in which the same reference characters designate the elements already described.

In this embodiment of the device, the latter comprises a heart shape cam 38 rigid with the gear 34 and with the gear 35 meshed with the gear 36 which is driven by the motor 45. The cam 38 controls the to-and-fro movement of a lever 49 pivoted at 50 and carrying the detecting means 42. A weak spring 51 constantly tends to eject the plate 1 which had been urged in the direction of the arrow $F_1$ and is retained by its teeth 48 with which come into engagement in succession two pawls 52 and 53 which are spaced a half pitch apart and are pivotally mounted at 54.

The lever 49 carries an arm 49*a* provided with a pin 55 capable of co-operating with an arm 52*a* of the pawl 52. The same lever carries moreover a projection 56 capable of co-operating with a pin 57 carried by the pawl 53.

At the end of each pivotal travel in either direction, the lever 49 actuates, through the medium of the pin 55 and the projection 56, either the pawl 52 or the pawl 53 which are in turn shifted thereby from the position of rest they occupy in FIG. 13 in which they are maintained by springs (not shown in the drawing). Each actuation of one of the pawls by the lever 49 causes the plate 1 to move a half-pitch in the direction of arrow $F_2$.

The gear 34 is meshed with a gear 58 (gear ratio 1:4) coaxial with a disc 59 provided with a notch 60 which co-operates with a pin 61 rigid with the gear 58 for driving the disc 59 through the medium of a spring 62 bearing against the spindle of the disc and hooked to a lug 63 rigid with this disc.

The notched disc 59 also co-operates with a pawl 64 which has a releasing ramp 64*a* and controls a contactor 65 series connected in the supply circuit of the motor 45. At the end of the call cycle, the pawl 64 drops into the notch 60 and opens the contactor 65. When the circuit of the motor is broken, the later tends, owing to inertia, to continue to rotate which is thus stopped mechanically by the pawl 64. The pin 61 takes up its play in the notch 60 and puts the spring 62 slightly understress.

When the plate 1 is fully inserted in the apparatus, said plate acts on the ramp 64*a* and shifts the pawl 64 out of the notch 60 which closes the contactor 65 (corresponding to starting up the motor 45). Owing to the action of the spring 62, the disc 59 (which was released from the pawl 64) effects the slight rotation allowed by the play between the pin 61 and the notch 60; the effect of this slight rotation is to prevent the pawl 64 from immediately dropping into the notch 60, the pawl thus bearing against the periphery of the disc 59.

At the end of the insertion travel (very slightly beyond its "departure" position), the plate 1 acts on a strip 66 which controls the opening of a contactor 67 in series with the contactor 65. The motor therefore remains in its "stop" position until the operator no longer acts on the plate 1 which he has fully inserted into the device. It is only when the plate 1 has been released by the operator that the motor supply circuit is closed and the automatic call operation can begin.

The advantage of this last embodiment of the automatic call device is that the successive travels of the detecting means 42 are parallel with one another, which permits use of short plates 1.

Further, there is no danger of composing a wrong call-number owing to a false operation by the operator.

It must be understood that the embodiments of call devices, described hereinbefore and shown in the accompanying drawings, have been given merely by way of examples, it being possible to effect any modification therein without departing from the scope of the invention as defined in the appended claims.

What I claim is:

1. An automatic telephone call device for automatically calling a requested subscriber's telephone apparatus by means of a call key constituted by a support plate carrying, grouped in transverse series succeeding one another longitudinally, characteristic signs of the call-number of the apparatus to be called, one of the two longitudinal edges of said plate being provided with retaining teeth, said call device comprising: yielding expelling means for producing an expelling force on any call key introduced in the device; retaining means for cooperating with the retaining teeth of the key; a sweeping lever for controlling said retaining means, exploring the surface of the key, carrying detecting means and for translating call signals corresponding to the characteristic signs of the call-number; a rotatory control cam acting on said sweeping lever for oscillating the latter; an electric motor operatively connected to said cam for rotating the latter; switching means for said motor and adapted to be controlled by the key; a pivoting control lever for actuating said switching means; a control disc operatively connected to said electric motor for actuating said control lever; transmission means inserted between the motor and the control disc and comprising a gear wheel operatively connected to the motor and coaxial with said disc; and spring means for operatively and yieldingly connecting, with a rotatory clearance, said gear wheel and said disc.

2. An automatic call device as claimed in claim 1, wherein the yielding expelling means comprise a spring angle-lever, one arm of which is held stationary, whereas the other arm is free and adapted to come in contact with a call key introduced in the device and to exert a push-back force on said key.

3. An automatic call device as claimed in claim 1, wherein the retaining means comprise two pivotal retaining levers having free ends provided with hooks for cooperating with the retaining teeth and controlled by the pivotal sweeping lever.

4. An automatic call device as claimed in claim 1, wherein the switching means comprise two switches in series, one of which, open at rest, is controlled by the pivoting switching lever, in order to be closed by the key, when the latter is introduced in the device, whereas the other switch, closed at rest, is actuable by said key, in order to be temporarily opened by said key when the latter is fully inserted into the device.

5. An automatic call device as claimed in claim 1, wherein the control disc has a notch and is adapted to act on the switching lever in order to stop the motor in a given position of the cam.

6. An automatic call device as claimed in claim 5, wherein the gear wheel carries a pin entering, with rotatory clearance, the notch of the disc and yieldingly applied on one side of said notch by the connecting spring means.

7. Automatic telephone call device for automatically calling a requested subscriber's telephone apparatus from a caller subscriber's telephone apparatus by means of a call key constituted by a support in the form of a rectangular plate carrying, grouped in transverse series succeeding one another longitudinally, characteristic signs of the call-number of the apparatus to be called, one longitudinal edge of said plate being provided with retaining teeth, said device comprising: spring means for producing an expelling force on every key introduced in the device; two pivotal retaining levers having free ends which are provided with hooks capable of co-operating with the retaining teeth of the plate; a pivotal sweeping lever able to control said retaining levers; detecting means mounted at the free end of the sweeping lever for exploring the surface of the key and translating call signals corresponding to the characteristic signs of the key; a rotary cam acting on the sweeping lever for oscillating the latter; an electric motor operatively connected to said cam for turning the latter; two switches in series, one of said switches, open at rest, being actuable, for closure, by the key, when the latter is introduced in the device and the other switch, closed at rest, being actuable, for its temporarily opening, by said key when the latter is fully inserted into the device; a pivotable switching lever for controlling the first-mentioned of said switches; a notched control disc operatively connected to said motor and acting on said switching lever when the cam is in a given angular position; and transmission means inserted between the motor and the notched control disc and comprising a gear wheel operatively connected to the motor and coaxial with said disc; a pin rigid with said gear wheel and entering the notch of the disc, and a spring for yieldingly connecting the said disc and the said gear wheel.

References Cited in the file of this patent

UNITED STATES PATENTS

| | | |
|---|---|---|
| 1,570,030 | Balch | Jan. 19, 1926 |
| 1,917,051 | Morin | July 4, 1933 |
| 1,950,187 | Mansel | Mar. 6, 1934 |
| 2,088,002 | Scott | July 27, 1937 |
| 2,191,913 | Lewis | Feb. 27, 1940 |
| 2,318,467 | Demeulenare | May 4, 1943 |
| 2,363,428 | Lobel | Nov. 21, 1944 |
| 2,426,600 | Demeulenare | Sept. 2, 1947 |
| 2,537,974 | Devaux | Jan. 16, 1951 |
| 2,873,317 | Hill | Feb. 10, 1959 |
| 2,964,324 | Brasseur | Dec. 13, 1960 |